C. HOPKINS.
Watchmaker's Lathe Chucks.
No. 233,097. Patented Oct. 12, 1880.
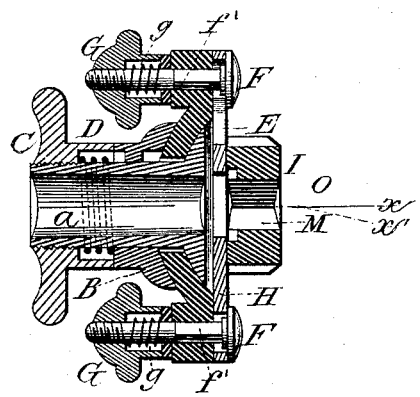
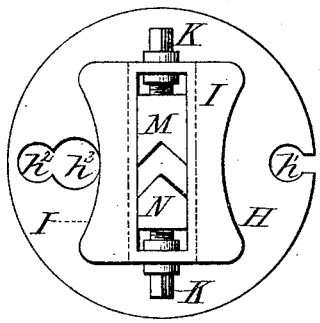
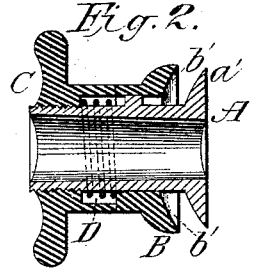
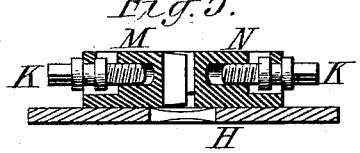
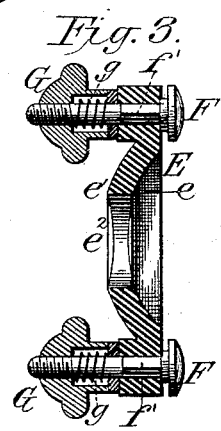
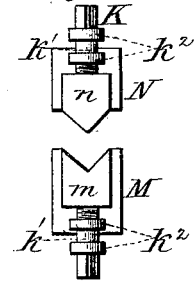
Witnesses:
Frederick Boardman
Samuel N. Stone
Inventor:
Caleb Hopkins

UNITED STATES PATENT OFFICE.

CALEB HOPKINS, OF WALTHAM, MASSACHUSETTS.

WATCH-MAKER'S LATHE-CHUCK.

SPECIFICATION forming part of Letters Patent No. 233,097, dated October 12, 1880.

Application filed July 30, 1878.

*To all whom it may concern:*

Be it known that I, CALEB HOPKINS, of Waltham, in the county of Middlesex, State of Massachusetts, have invented certain Improvements in Lathe-Chucks, of which the following is a specification.

The object of my invention is (by combining a knuckle or ball-and-socket joint within the chuck-body, as hereinafter described, with a sliding or laterally-adjustable plate carrying the clamping-jaws of the chuck) to render work in the chuck readily adjustable, both to upright and to center, and thus to secure results equivalent in these regards to resting the work on dead-centers, and so to obviate the hitherto need of the use of wax in fine watch-pivoting and other like work when done on a lathe with live-spindle and without back center.

In the accompanying drawings, representing my invention, Figure 1 is a longitudinal section thereof, showing the several parts of the chuck combined in their respective positions. Fig. 2 represents the parts A, B, C, and D of the same with the other parts detached therefrom. Fig. 3 represents the parts E, F, and G of the same detached from the other parts. Fig. 4 is a front view of the jaw-plate and clamping-jaws. Fig. 5 is a section of the same cut through in line with the working screws K K. Fig. 6 is an end view of the block I attached to the plate or disk H for confining the sliding jaws M N to their respective places, the jaws being here represented as withdrawn. Fig. 7 is a front view of the sliding jaws M N, together with the screws K K used in operating them.

In the details of my invention corresponding letters used in the several figures in all cases denote the same parts of the chuck.

A (represented in both Figs. 1 and 2) is a tube-shaped piece with flanged forward end, of form as at $a'$, the hole $a$ through its center slightly tapered for convenience of attaching it to the lathe-spindle by means of a taper arbor, and with a screw-nut, C, on its back end. B is a sleeve or collar with flanged cup-shaped forward end, made to fit on and to slide freely back and forth on the cylindrical part of A, back of the flange $a'$. D is a spiral spring placed on the cylindrical part of A, between the sleeve B and the nut C, within a chamber formed in the forward part of C, being so placed for the purpose of producing a continuous forward pressure on the sleeve B.

E is a section of a hollow globe or concavo-convex piece, with hole $e^2$ through its center a little larger than the cylindrical part of A, and with a flat, level, circular rim of uniform width and thickness extending squarely outward from its outer edge, the common center of both the inner and outer surfaces of the globular part being at a point, $o$, a little outside the face of the clamping-jaws M N, as shown in Fig. 1, and from its peculiar form and position in the chuck, between the flanges $a'$ and $b'$, is made to serve both as a face-plate for sustaining the jaw-plate H and as the central or oscillating part of the knuckle-joint for adjusting to upright. In direct combination with E are the spring-bolts F F, with squared shanks $f'f'$, (placed opposite to each other in the flat circular rim of E,) which, with the aid of the springs $q\ q$ and the jam-nuts G G, serve to hold the plate H to place on the face of E, and to fasten it there after the work has been duly centered.

H, Fig. 4, is a flat level disk of uniform thickness, and pierced with the holes $h'\ h^2\ h^3$, as represented, $h^3$ being of size to pass freely over the head of either of the bolts F F, and $h'$ and $h^2$ of smaller size, but sufficiently large to allow of the requisite side shake around the shanks of the bolts K K for readily centering the work held in the clamping-jaws by lateral movement of the disk. The holes $h^2\ h^3$ open, as represented, into each other, while from $h'$ a channel is cut through to the outer edge of the disk sufficiently large to allow the shank of either of the bolts F F to pass freely through it.

Across the center of the face of the disk H is fastened, by means of screws from the back of the disk, the block I, which is made with channel $i$ underneath extending through its whole length, and a slot narrower than the channel, but parallel therewith, cut squarely through to the upper side or face of the block, and extending to within about one-sixteenth of an inch (more or less) of the end thereof, this provision being for the purpose of receiving and holding in place the clamping-jaws M N, the forms of which are shown in Fig. 7, the broader parts being made to fit the channel $i$, Fig. 6, while their backs rest down level on the face of the disk H, and the parts $m$ $n$ rise up squarely through the central slot to the level of the face of the block, in which position they are moved toward or from each other by means of the screws K K, the shanks $k'$ $k'$ of which are passed into the slots $i'$ $i'$ from the under side of the two ends of the block, as shown in Fig. 6, and are prevented from moving longitudinally either way by the collars $k^2$ $k^2$ $k^2$ $k^2$, as represented, while the screws work directly in the parts $m$ $n$ of the jaws, as shown in Fig. 5.

The mode of using my invention is as follows: The work to be operated upon is placed in the jaws M N and fastened there. The hole $h^3$ in the disk C is then placed over the head of one of the bolts F F in such position that the opposite edge of the disk will fall inside the inner edge of the head of the other bolt, from which position, the nuts G G having been loosened and the bolts pressed forward, the disk is slipped under their heads and their shanks brought respectively within the holes $h'$ $h^2$. The work is then spun to center by bringing some suitable instrument to bear steadily against it at the point O, Fig. 1, while the spindle of the lathe slowly revolves, the springs $g$ $g$ within nuts G G, by their steady draw upon the bolts K K, serving in the meantime to retain it in place until, by tightening the nuts G G after centering the work at O, the disk is fastened firmly to position. This done, if the work is found to be out of upright or to wabble at the outer end, as indicated by the dotted line $x'$, the nut C is loosened to give freedom of movement to the knuckle-joint, the lathe again set in motion, and the instrument, as in the previous case, brought to bear against the outer end of the work till it assumes the position indicated by the line $x$, the spring D, by its steady pressure against the collar B, serving like purpose in this case as that of $g$ $g$ by their draw upon the bolts K K in the previous one. Having thus centered the work at the outer end, as had been previously done at the point O, the nut C is again tightened, thus completing the adjustment of the work.

While my invention is designed especially for watch-makers' use in fine pivoting and like work, it will be readily seen that by increasing its size it may be employed with equal advantage in many kinds of machinists' work where accuracy of adjustment in the lathe is a matter of importance.

I am aware that prior to my invention chucks have been made that were rendered adjustable by means of an internal knuckle or ball-and-socket joint, and that others have been made that were adjustable by means of a sliding jaw-plate, in combination with a rigid or unadjustable face-plate.

I therefore do not claim, broadly, either of these modes of adjustment; but

What I do claim as new, and desire to secure by Letters Patent, is—

1. The combination of the face-plate E, carrying the spring-bolts F F and rendered adjustable by means of a central knuckle or socket-joint, with the sliding jaw-plate H, substantially as described, and for the purposes set forth.

2. The compound adjustable chuck herein described, composed of the parts A, B, C, D, E, F, G, H, I, K K, and $g$ $g$, substantially as set forth.

CALEB HOPKINS.

Witnesses:
FREDERICK BOARDMAN,
HUMPHREY WADDINGTON.